May 1, 1934.   K. ENZINGER   1,956,673
PROCESS FOR STERILIZING FILTER MASSES

Filed Nov. 30, 1932

Inventor:
Karl Enzinger
By A. E. Odell
Attorney

Patented May 1, 1934

1,956,673

UNITED STATES PATENT OFFICE 1,956,673

PROCESS FOR STERILIZING FILTER MASSES

Kärl Enzinger, Heidelberg, Germany, assignor to Enzinger - Union - Werke Aktiengesellschaft, Pfeddersheim, Germany Application November 30, 1932, Serial No. 645,081
In Germany December 22, 1931

1 Claim. (Cl. 210—177)

In the use of filters employing compressed cakes of fibrous filter pulp or filter mass, which find extensive employment for instance for milk, beer, wine and water, the soiled, paste clogged filter cakes are cleansed in known manner after removal from the filter cases by loosening in a filter mass washing machine and treatment with water.

The mode of operation of such a machine and the cleansing process therein are generally known; mention will only be made of the fact that mechanical cleansing, sterilization of the filter mass by heat and finally cooling all take place in the machine. The preparation of the filter cakes then takes place outside the machine by a press; the filter case is then charged with the pressed cakes and the filter finally pressed together to close it. The filter now ready for use is filled with water and waits until put into service again.

This mode of operation has the disadvantage above all that the washed and sterilized mass after being put into the filter is no longer sterile; this is because the cooling of the mass after sterilization is effected with water which is not sterile, because the press treatment cannot be effected in sterile conditions, and because the filter itself is not sterile and then stands for a long period, for instance over night, under ordinary non-sterile main water.

In the process according to the invention the mechanical cleansing of the filter mass, that is the washing out of the muddy particles and the like is still effected in the washing machine with warm water until the outflowing water is clear; the preparation of the filter cakes and their insertion in the filter cases then take place without previous sterilization of the mass in the washing machine being necessary. After pressing together the cases, the filter is ready for service and sterilization of the completed filter and the mass therein now takes place for example by blowing through steam, gases or the like, or by washing through disinfecting liquid for instance chlorinated water or ozonized water or the like. For better utilization of the disinfecting agent, it can be circulated in closed circuit. The filter can then be put into operation in sterile condition.

The process according to the invention not only results in a sterile filter but there is also a considerable saving in water, steam and time. Since the washing machine is only in operation during the period of mechanical washing and of pressing of the cakes, there is a saving of power while the output is raised because owing to the shorter washing period the machine is sooner free for fresh washings.

To enable the filter mass to be sterilized in the filter itself, an arrangement is advantageous which is characterized by the filter being in communication with circulating or single flow means for a disinfecting agent, which can however be of the most diverse kind.

By way of example six arrangements of apparatus for carrying out the process according to the invention are diagrammatically illustrated in the accompanying drawing.

Figure 1:
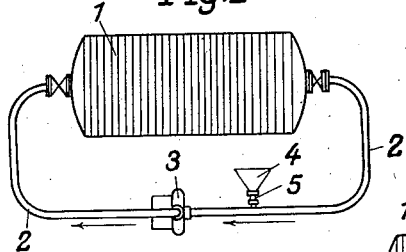
Figures 1 to 3 are similar diagrammatic views showing three different arrangements using closed circuit circulation.

In all the figures 1 is the filter.

In Figure 1 the inlet and outlet of the filter 1 are connected by a pipe line 2 in which is included a pump 3. A funnel and cock 5 are also provided, by which a disinfecting agent can be introduced into the pipe.

The mode of operation is as follows:

After the filter layers or cakes have been put into the filter, the latter screwed together and made ready for service, the cock 5 is opened and disinfectant poured in through the funnel 4. The cock is thereupon closed and the disinfectant circulated by the pump 3, flowing in the direction of the arrow, through the filter and back to the suction side of the pump; in this way the circuit is closed. During the driving of the disinfectant through the filter 1 all the internal parts which later come into contact with the actual liquid to be filtered are rendered germ free.

When the sterilization is complete the pipe line 2 is unscrewed from the filter 1 and the latter coupled to the line for the liquid to be filtered.

Figure 2:
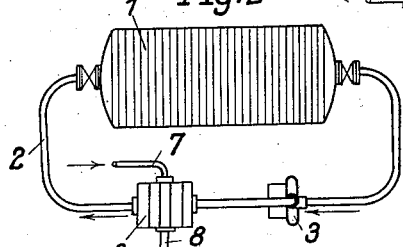

Figure 2 illustrates a similar apparatus. The difference compared with Figure 1 is that a heater 6 with steam supply 7 and condensate offtake 8, which can also be used as a cooler, is provided; in this way the sterilizing agent, for example water, can be brought to sterilizing temperature and immediately after sterilization cooled again, indirectly that is by heat exchange and without mixing of the heating or cooling medium with the circulating liquid.

Figure 3:
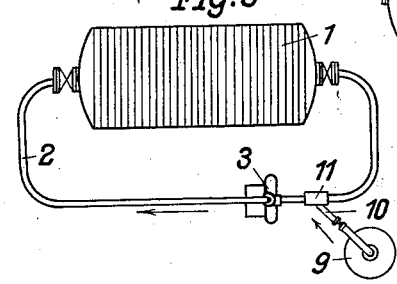

Figure 3 shows a similar arrangement to Figures 1 and 2. Here a container 9 for the disinfectant is provided which is connected by pipe 10 with a known mixing device 11 by which the disinfectant is introduced into the pipe line 2. Either gaseous or liquid disinfectants can be admixed as may be desired.

Figure 4:
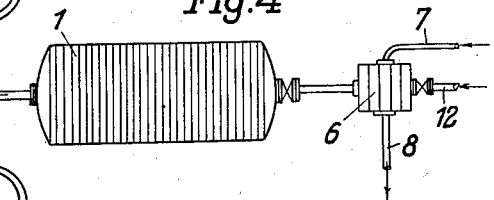
Figures 4 and 5 show two further arrangements using open circuit through flow of the sterilizing agent.

In Figure 4 a filter is shown in which instead of closed circuit circulation by pump as is provided in Figures 1-3, open circuit through flow of disinfectant through the filter 1 is employed. If sterilization is effected for instance with water, the water which enters at 12 is raised to sterilization temperature by the heater 6 which has a heating agent supply 7 and offtake 8, for instance by the action of steam, and is driven through the filter. Subsequent cooling can then be effected in a suitable manner.

Figure 5:
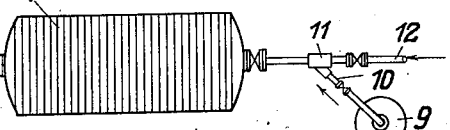

Figure 5 shows a similar arrangement to Figure 4, also operating an open circuit. In place of the heater of Figure 4, a container 9 for disinfecting is here provided, which is connected with a mixing device 11 in the water pipe 12 by a pipe 10, in similar manner to the arrangement of Figure 3.

In the arrangements of Figures 1-5 both the circulating means and the heat exchanger are arranged outside the filter frame. It has been found advantageous to arrange these devices, or at least one of them in particular the heat exchanger, within the filter.

If the heat exchanger is within the filter its principal radiating surfaces are made usable for heating the filter contents and there remains a relatively small edge as a waste radiating surface giving low radiation loss. A further advantage is that the production of the heat exchanger is simplified because it can be made of the same form as the filter and can be mounted in the filter frame. A considerable saving of space and simplification of control and maintenance are advantages of this arrangement.

The mounting of the circulating apparatus, that is of the pump and connecting pipes, on the filter frame reduces pipe lengths to the minimum whereby heat losses are avoided and an arrangement always ready for use and easy to supervise is produced.

The arrangement of the heat exchanger and circulating apparatus outside the filter, as in Figures 1-5 will advantageously be used where several filters in a single works are to be treated by the process according to the invention. The heat exchanger and the circulating apparatus can for this purpose be transportably mounted on a common platform and be provided with connection pieces and pipes for the particular filter to be treated.

Figure 6:
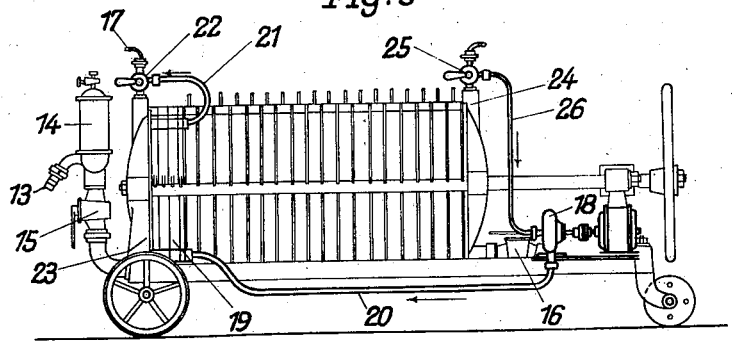
Figure 6 is a side elevation of a similar arrangement to Figures 2 but with the heat exchanger and circulating device combined with the filter frame.

In Figure 6 a transportably cased filter is shown in which both the circulating apparatus and the heat exchanger are combined with the filter frame. Such filters are extensively used for example for the filtration of beer and the like.

At one end of the filter is the inlet connection 13 for the entry of the liquid to be filtered. Further the sight lantern 14 and cock 15 are provided in the usual way. At the opposite end of the filter is the outflow cock 16.

If the completely assembled filter in which the filter plates, cakes or the like have been placed, is to be sterilized, the filter is first filled with water. The inlet therefor is at 17. The pump 18 by which the liquid is circulated is mounted upon the filter frame. The heat exchanger is marked 19; it is supplied for example with steam. To simplify the drawing, the connections for this purpose are omitted. The sterilizing agent, in the present case water, follows the path indicated by the arrows, being driven through pipe 20 into the heat exchanger 19 and there raised to sterilizing temperature. The water leaves the exchanger 19 through pipe 21 and with the three way cock 22 suitably set, passes through the end 23 of the filter and is distributed throughout the interior thereof. The sterilizing agent leaves the filter at the other end through the connection 24 and with the three way cock 25 suitably set passes into the pipe 26 which carries it in the direction of the arrow to the suction side of the pump.

It is pointed out that Figure 6 is only an example of the direct combination of the filter with the circulating apparatus and heat exchanger.

What I claim is:

A process for cleansing and sterilizing filter presses charged with fibrous filter mass which consists in cleansing the mass mechanically outside the filter press, forming it into cakes and charging the filter press therewith and sterilizing the cakes within the filter press by passing a fluid medium not having inherent sterilizing properties but raised to sterilizing temperature therethrough in closed circuit, and then cooling the cakes by cooling said medium and continuing to circulate it.

KÄRL ENZINGER.